US011107667B1

(12) United States Patent
Ugarov et al.

(10) Patent No.: US 11,107,667 B1
(45) Date of Patent: Aug. 31, 2021

(54) DUAL POLARITY ION MANAGEMENT (71) Applicant: Thermo Finnigan LLC, San Jose, CA (US)

(72) Inventors: Mikhail V. Ugarov, San Jose, CA (US); Oleg Silivra, Milpitas, CA (US)

(73) Assignee: Thermo Fisher Scientific, San Jose, CA (US)

( * ) Notice: Subject to any disclaimer, the term of this patent is extended or adjusted under 35 U.S.C. 154(b) by 0 days.

(21) Appl. No.: 16/988,291

(22) Filed: Aug. 7, 2020

(51) Int. Cl.
| H01J 49/02 | (2006.01) |
| H01J 49/40 | (2006.01) |
| H01J 49/16 | (2006.01) |
| H01J 49/06 | (2006.01) |
| H01J 49/42 | (2006.01) |
| G01N 27/49 | (2006.01) |

(52) U.S. Cl.
CPC ............ *H01J 49/025* (2013.01); *G01N 27/49* (2013.01); *H01J 49/022* (2013.01); *H01J 49/067* (2013.01); *H01J 49/165* (2013.01); *H01J 49/40* (2013.01); *H01J 49/426* (2013.01); *H01J 49/429* (2013.01); *H01J 49/4215* (2013.01); *H01J 49/4275* (2013.01)

(58) Field of Classification Search
CPC ........ H01J 49/025; H01J 49/165; H01J 49/40; H01J 49/426; H01J 49/067; H01J 49/4215; H01J 49/022; H01J 49/4275; H01J 49/429; G01N 27/49

USPC .................................................. 250/281, 282
See application file for complete search history.

(56) References Cited

U.S. PATENT DOCUMENTS

| 2003/0155502 A1* | 8/2003 | Grosshans | ............ H01J 49/424 |
| | | | 250/282 |
| 2019/0341241 A1* | 11/2019 | Kaushal | .................. H01J 49/10 |
| 2020/0303174 A1* | 9/2020 | Midorikawa | ....... H01J 49/0095 |

\* cited by examiner

*Primary Examiner* — Kiet T Nguyen
(74) *Attorney, Agent, or Firm* — David A. Schell (57) ABSTRACT

A mass spectrometer includes an ion source configured to ionize a sample to produce ions; a mass analyzer configured to separate the ions based on their mass-to-charge ratio; a detector configured to detect ions; an ion optics component configured to direct ions along at least part of the path from the ion source to the mass analyzer to the detector; and a controller. The controller is configured to switch the source at a first time from a first polarity source voltage to a second polarity source voltage; and switch the detector or the ion optics component at a second time from a first voltage to a second voltage, the second time being offset from the first time, the first voltage being the first polarity detector voltage or the first polarity ion optics voltage and the second voltage being the second polarity detector voltage or the second polarity ion optics voltage.

20 Claims, 6 Drawing Sheets

DUAL POLARITY ION MANAGEMENT

FIELD

The present disclosure generally relates to the field of ion chromatography including dual polarity ion management.

INTRODUCTION

Mass spectrometry can involve the analysis of positive or negative ions. Generally, a change in ion polarity can involve changes to ion optics potentials, analyzer voltages, detector voltages, and ion source settings. Reestablishment of a stable ion beam takes time after such changes. From the foregoing it will be appreciated that a need exists for improved systems and methods to reduce the time needed for polarity switching so that more time can be devoted to ion analysis.

SUMMARY

In a first aspect, a mass spectrometer can include an ion source configured to ionize a sample to produce ions; a mass analyzer configured to separate the ions based on their mass-to-charge ratio; a detector configured to detect ions; an ion optics component configured to direct ions along at least part of the path from the ion source to the mass analyzer to the detector; and a controller. The controller can be configured to switch the source at a first time from a first polarity source voltage to a second polarity source voltage; and switch the detector or the ion optics component at a second time from a first polarity voltage to a second polarity voltage, the second time being offset from the first time. The first polarity voltage can be the first polarity detector voltage or the first polarity ion optics voltage and the second polarity voltage can be the second polarity detector voltage or the second polarity ion optics voltage.

In various embodiments of the first aspect, the controller can be further configured to switch the source or the ion optics voltage by changing from a first voltage to an overdrive voltage and changing to the second voltage when the voltage output reaches the second voltage. The first voltage being the first polarity source voltage or the first polarity ion optics voltage and the second voltage being the second polarity source voltage or the second polarity ion optics voltage. The magnitude of the difference between the first voltage and the overdrive voltage being greater than the magnitude of the difference between the first voltage and the second voltage. In particular embodiments, the magnitude of the difference between the first polarity source voltage and the overdrive voltage can be at least 10% greater than the magnitude of the difference between the first polarity source voltage and the second polarity source voltage, such as at least 20% greater.

In various embodiments of the first aspect, the second time can be offset from the first time by at least an ion flight time from the source to the detector.

In various embodiments of the first aspect, the controller can be further configured to switch at least one mass analyzer at a third time from a first polarity analyzer voltage to a second polarity analyzer voltage, the third time being offset from the first time by at least an ion flight time from the source to the mass analyzer. In particular embodiments, the third time can be substantially the same as the second time.

In various embodiments of the first aspect, the ion optics component can include a lens or an ion guide.

In various embodiments of the first aspect, the mass analyzer can include an ion trap or a mass filter.

In a second aspect, a method can include analyzing a first ion at a first polarity; switching a source at a first time from a first polarity source voltage to a second polarity source voltage; switching at least one ion optics component or mass analyzer at a second time from a first voltage to a second voltage, the second time being offset from the first time by at least an ion flight time from the source to the ion optics component or the mass analyzer; and analyzing a second ion at the second polarity. The first voltage can be the first polarity ion optics voltage or the first polarity mass analyzer voltage and the second voltage can be the second polarity ion optics voltage or the second polarity mass analyzer voltage In various embodiments of the second aspect, switching the source voltage, the ion optics voltage, or the mass analyzer voltage can include changing from a first voltage to an overdrive voltage and changing to the second voltage when the voltage output reaches the second voltage. The first voltage can be the first polarity source voltage, the first polarity ion optics voltage, or the first polarity mass analyzer voltage and the second voltage can be the second polarity source voltage, the second polarity ion optics voltage, or the second polarity mass analyzer voltage. The magnitude of the difference between the first voltage and the overdrive voltage can be greater than the magnitude of the difference between the first voltage and the second voltage. In particular embodiments, the magnitude of the difference between the first polarity source voltage and the overdrive voltage can be at least 10% greater than the magnitude of the difference between the first polarity source voltage and the second polarity source voltage, such as at least 20% greater.

In various embodiments of the second aspect, the second time can be offset from the first time by at least an ion flight time from the source to the ion optics component or the mass analyzer.

In various embodiments of the second aspect, the ion optics component can include a lens or an ion guide.

In various embodiments of the second aspect, the mass analyzer can include an ion trap or a mass filter.

In a third aspect, a method can include analyzing a first ion at a first polarity; switching a source at a first time from a first polarity source voltage to a second polarity source voltage; switching a detector at a second time from the first polarity detector voltage to the second polarity detector voltage, the second time being offset from the first time; and analyzing a second ion at the second polarity.

In various embodiments of the third aspect, switching the source voltage or the detector voltage can include changing from a first voltage to an overdrive voltage and changing to the second voltage when the voltage output reaches the second voltage. The first voltage can be the first polarity source voltage or the first polarity detector voltage and the second voltage can be the second polarity source voltage or the second polarity detector voltage. The magnitude of the difference between the first voltage and the overdrive voltage can be greater than the magnitude of the difference between the first voltage and the second voltage. In particular embodiments, the magnitude of the difference between the first voltage and the overdrive voltage is at least 10% greater than the magnitude of the difference between the first voltage and the second voltage, such as at least 20% greater.

In various embodiments of the third aspect, the second time can be offset from the first time by at least an ion flight time from the source to the detector.

In various embodiments of the third aspect, the method can further include switching at least one ion optics component at a third time from a first polarity ion optics voltage to a second polarity ion optics voltage. The third time can be offset from the first time by at least an ion flight time from the source to the ion optics component. In particular embodiments, the ion optics component includes a lens or an ion guide. In particular embodiments, the third time is the same as the second time.

In various embodiments of the third aspect, the method can further include switching at least one mass analyzer at a fourth time from a first polarity analyzer voltage to a second polarity analyzer voltage. The fourth time can be offset from the first time by at least an ion flight time from the source to the mass analyzer. In particular embodiments, the mass analyzer can include an ion trap or a mass filter. In particular embodiments, the fourth time can be the same as the second time.

DRAWINGS

For a more complete understanding of the principles disclosed herein, and the advantages thereof, reference is now made to the following descriptions taken in conjunction with the accompanying drawings, in which.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DESCRIPTION OF VARIOUS EMBODIMENTS

Embodiments of systems and methods for ion separation are described herein.

The section headings used herein are for organizational purposes only and are not to be construed as limiting the described subject matter in any way.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless described otherwise, all technical and scientific terms used herein have a meaning as is commonly understood by one of ordinary skill in the art to which the various embodiments described herein belongs.

It will be appreciated that there is an implied "about" prior to the temperatures, concentrations, times, pressures, flow rates, cross-sectional areas, etc. discussed in the present teachings, such that slight and insubstantial deviations are within the scope of the present teachings. In this application, the use of the singular includes the plural unless specifically stated otherwise. Also, the use of "comprise", "comprises", "comprising", "contain", "contains", "containing", "include", "includes", and "including" are not intended to be limiting. It is to be understood that both the foregoing general description and the following detailed description are exemplary and explanatory only and are not restrictive of the present teachings.

As used herein, "a" or "an" also may refer to "at least one" or "one or more." Also, the use of "or" is inclusive, such that the phrase "A or B" is true when "A" is true, "B" is true, or both "A" and "B" are true. Further, unless otherwise required by context, singular terms shall include pluralities and plural terms shall include the singular.

A "system" sets forth a set of components, real or abstract, comprising a whole where each component interacts with or is related to at least one other component within the whole.

Mass Spectrometry Platforms

Figure 1:
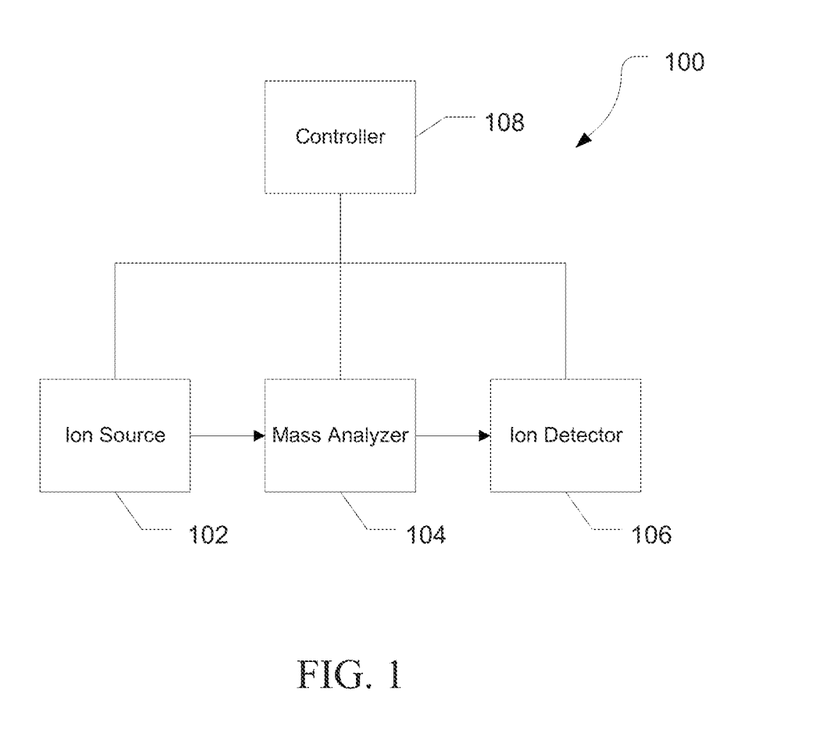
FIG. 1 is a block diagram of an exemplary mass spectrometry system, in accordance with various embodiments.

Various embodiments of mass spectrometry platform 100 can include components as displayed in the block diagram of FIG. 1. In various embodiments, elements of FIG. 1 can be incorporated into mass spectrometry platform 100. According to various embodiments, mass spectrometer 100 can include an ion source 102, a mass analyzer 104, an ion detector 106, and a controller 108.

In various embodiments, the ion source 102 generates a plurality of ions from a sample. The ion source can include, but is not limited to, a matrix assisted laser desorption/ionization (MALDI) source, electrospray ionization (ESI) source, atmospheric pressure chemical ionization (APCI) source, atmospheric pressure photoionization source (APPI), inductively coupled plasma (ICP) source, electron ionization source, chemical ionization source, photoionization source, glow discharge ionization source, thermospray ionization source, and the like.

In various embodiments, the mass analyzer 104 can separate ions based on a mass-to-charge ratio of the ions. For example, the mass analyzer 104 can include a quadrupole mass filter analyzer, a quadrupole ion trap analyzer, a time-of-flight (TOF) analyzer, an electrostatic trap (e.g., Orbitrap) mass analyzer, Fourier transform ion cyclotron resonance (FT-ICR) mass analyzer, and the like. In various embodiments, the mass analyzer 104 can also be configured to fragment the ions using collision induced dissociation (CID) electron transfer dissociation (ETD), electron capture dissociation (ECD), photo induced dissociation (PID), surface induced dissociation (SID), and the like, and further separate the fragmented ions based on the mass-to-charge ratio.

In various embodiments, the ion detector 106 can detect ions. For example, the ion detector 106 can include an electron multiplier, a Faraday cup, and the like. Ions leaving the mass analyzer can be detected by the ion detector. In various embodiments, the ion detector can be quantitative, such that an accurate count of the ions can be determined.

In various embodiments, the controller 108 can communicate with the ion source 102, the mass analyzer 104, and the ion detector 106. For example, the controller 108 can configure the ion source 102 or enable/disable the ion source 102. Additionally, the controller 108 can configure the mass analyzer 104 to select a particular mass range to detect. Further, the controller 108 can adjust the sensitivity of the ion detector 106, such as by adjusting the gain. Additionally, the controller 106 can adjust the polarity of the ion detector 106 based on the polarity of the ions being detected. For example, the ion detector 106 can be configured to detect positive ions or be configured to detected negative ions.

Ion Polarity Switching

Fast switching of the ion polarity of a mass spectrometer is important to maintain high speed of analysis of complex assays. This can be particularly important for instruments with high speed analyzers such as triple quadrupole mass spectrometers where single transition can be analyzed on a millisecond time scale.

The time it takes to switch from one polarity to another can be determined not only by the speed of electronics controlling voltages on the ion optical elements, but some other factor such as ESI spray stabilization and time of flight of ions through the system.

For example, at the time when the polarity of the source high voltage supply has settled to a new value, it likely takes additional time for the electrochemistry of the spray to establish itself to start producing ions in the new polarity at full intensity. When this happens, there can still be ions of the previous polarity that continue the motion through the system. Even if the detector and other electronics are ready to process the new polarity ions, a wait period must be inserted to make sure the ions of previous polarity actually make it all the way through the system. This wait period depends on several factors including specifics of the mass analyzer, mass to charge ratio of ions and specific voltage settings. As a result, the delay can be as long as several milliseconds.

Figure 2:
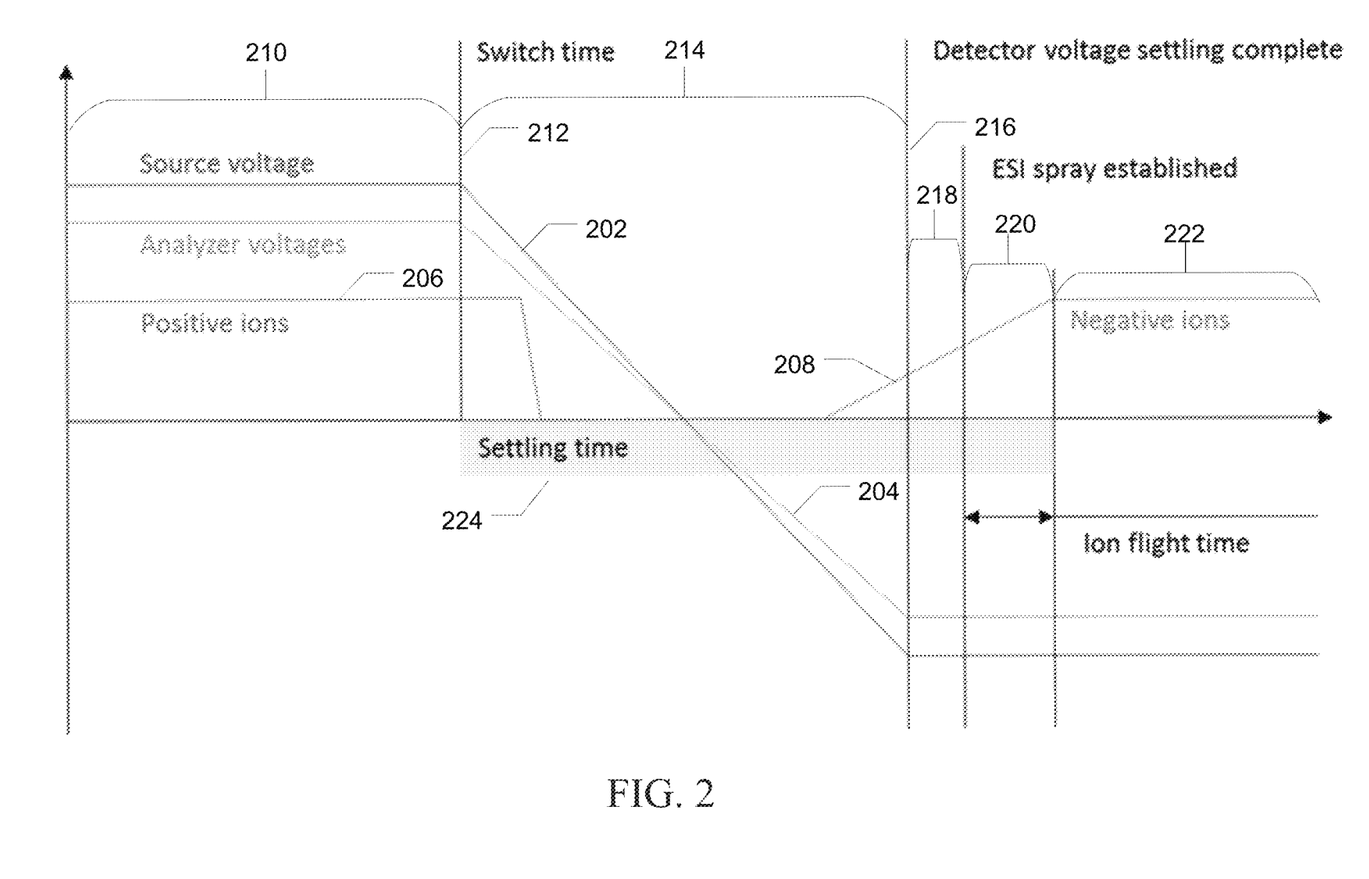
FIG. 2 is a timing diagram illustrating the time for switching ion polarity in a mass spectrometer.

FIG. 2 is a timing diagram illustrating the time delay created by switching ion polarity from positive ions to negative ions. Line 202 represents the source voltage, line 204 represents the analyzer and detector voltages, line 206 represents ion signal from positive ions in the system, and line 208 represents the ion signal from negative ions.

At time 210, the system can be configured for a first polarity. At time 212, the source voltages, the analyzer voltages, and detector voltages can be switched to a second polarity. Time 214 can represent the time needed for the electronics to switch from the first polarity to the second polarity. At 216, the electronic settling can be complete. However, there can still be time 218 required before the electrospray ionization stabilizes. Additionally, time 220 can represent the flight time necessary for ions to travel from the source to the detector. Finally, at time 222, a stable stream of negative ions can reach the detector. Time 222 can represent the continued analysis of negative ions. Time 224 represents the entire delay introduced by the polarity switch from the switch time 212 when data collection ends due to the switching of the detector polarity to the time 222 when a stable ion stream is reestablished to the detector and data collection can be restarted.

In various embodiments, switching time can be reduced by taking advantage of the flight time between upstream and downstream elements. An upstream element can be switched while data can continue to be collected for ions of the first polarity that passed the upstream elements prior to switching. When the time required for switching the upstream element is greater than the time required for switching the downstream elements, the time lost to switching can be reduced by as much as the ion flight time between the elements.

Figure 3:
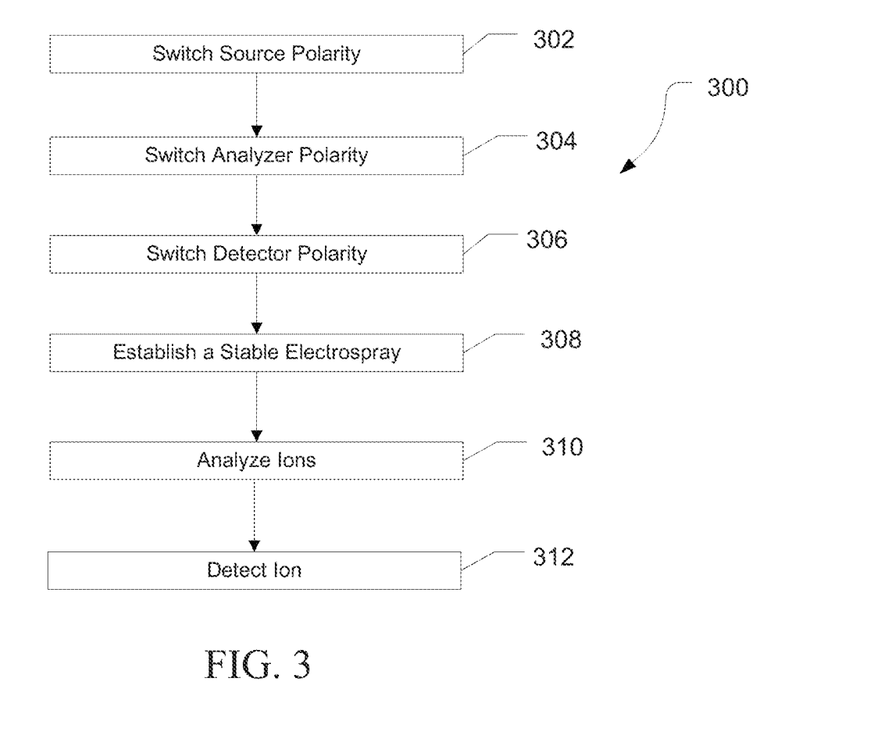
FIG. 3 is a flow diagram illustrating a method for switching ion polarity in a mass spectrometer, in accordance with various embodiments.
Figure 4:
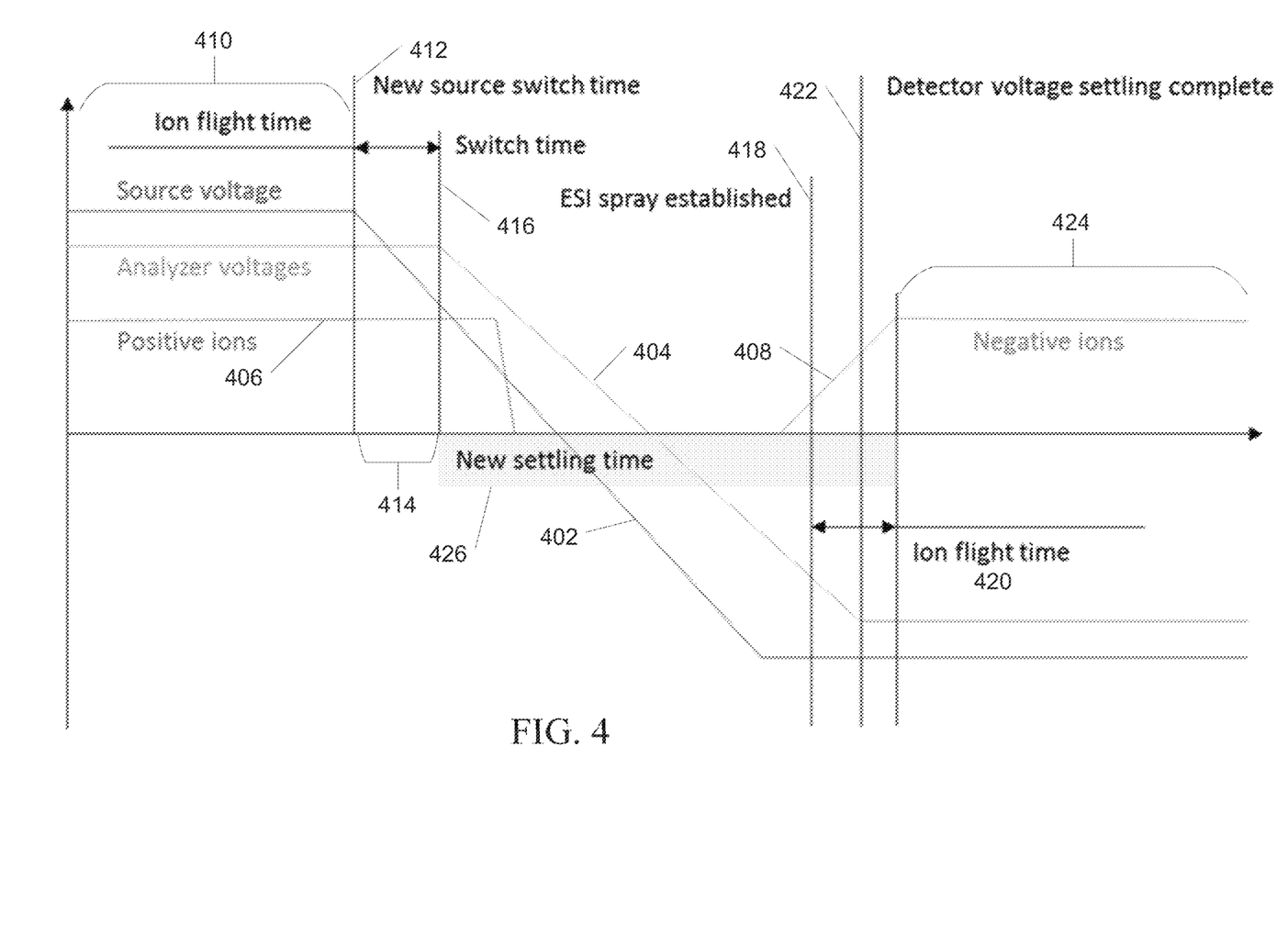
FIG. 4 is a timing diagram illustrating a modified timing for switching ion polarity in a mass spectrometer, in accordance with various embodiments.

FIGS. 3 and 4 illustrate an exemplary method for shortening the settling time between the end of detecting the positive ions and the beginning of detecting negative ions. At 302 of FIG. 3, the source polarity is switched at first time, at 304, the analyzer polarity can be switched at a second time, and at 306, the detector polarity can be switched at a third time.

In various embodiments, the second and third times can be delayed from the first time by an amount of time not greater than the flight time necessary for ions to travel from the source to the detector. This can allow ions of the first polarity already produced by the source to continue through the system to the detector where they can be analyzed and measured.

At 308, a stable electrospray can be established once the source voltage has settled. At 310, the ions of the second polarity can be analyzed, and at 312, the ions of the second polarity can reach the detector.

The relative timing of the method outlined in FIG. 3 is illustrated in FIG. 4. Line 402 represents the source voltage, line 404 represents the analyzer and detector voltages, line 406 represents the ion signal from positive ions in the system, and line 408 represents the ion signal from negative ions.

At time 410, the system can analyze ions of a first polarity, such as positive ions in this example. At time 412, the source voltages can be switched to a second polarity, such as negative ions in this example. During time 414, positive ions produced in the source before the polarity change can continue to travel through the analyzer to the detector. At 416, the analyzer voltages and detector voltages can be switched to a second polarity (negative). At 418, electrospray can be reestablished to produce negative ions. Preferably, the voltages for the analyzer and other ion optics can be stabilized by 418. Time 420 is the time it takes for the negative ions from the stable spray to reach the detector. During time 420, the detector voltage can finish settling at 422, and data collection can begin once the stable beam has reached the detector at 424. Using this approach, the settling time 426 when no data collection is taking place can be reduced compared to settling time 224 of FIG. 2.

The methods illustrated in FIGS. 3 and 4 are applicable to other combinations of elements. For example, in some instance it may take longer to change collision cell conditions than for other components and it can reduce the time lost to switching by the flight time from the collision cell to the detector. In general, the slowest switching component can begin the switch first and downstream elements can switch after a delay. Elements upstream of the slowest switching element can be switched along with the slowest switching element or later, provided they complete the switch early enough to provide the slowest switching element ions when it is ready.

Figure 5:
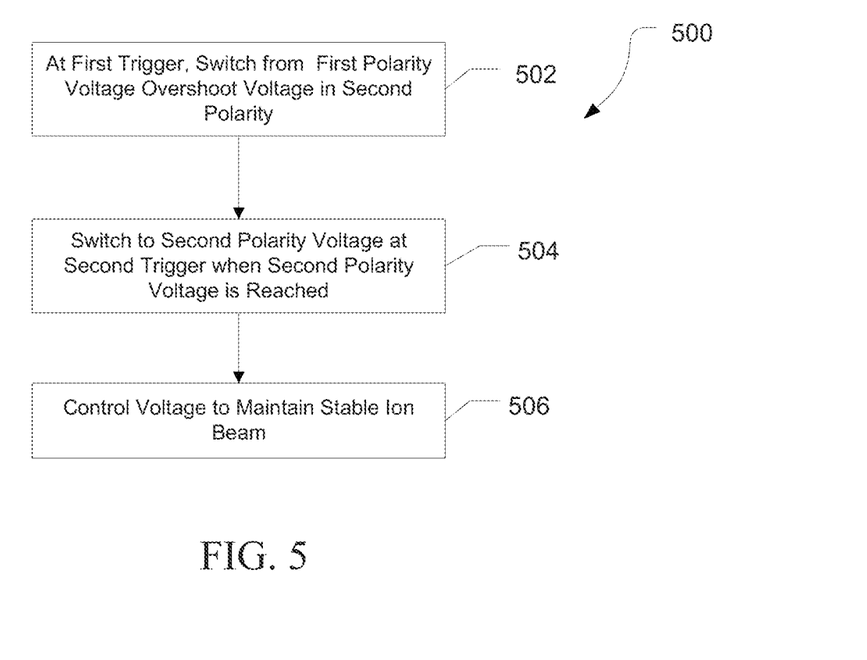
FIG. 5 is a flow diagram illustrating a method for switching ion source polarity, in accordance with various embodiments.
Figure 6:
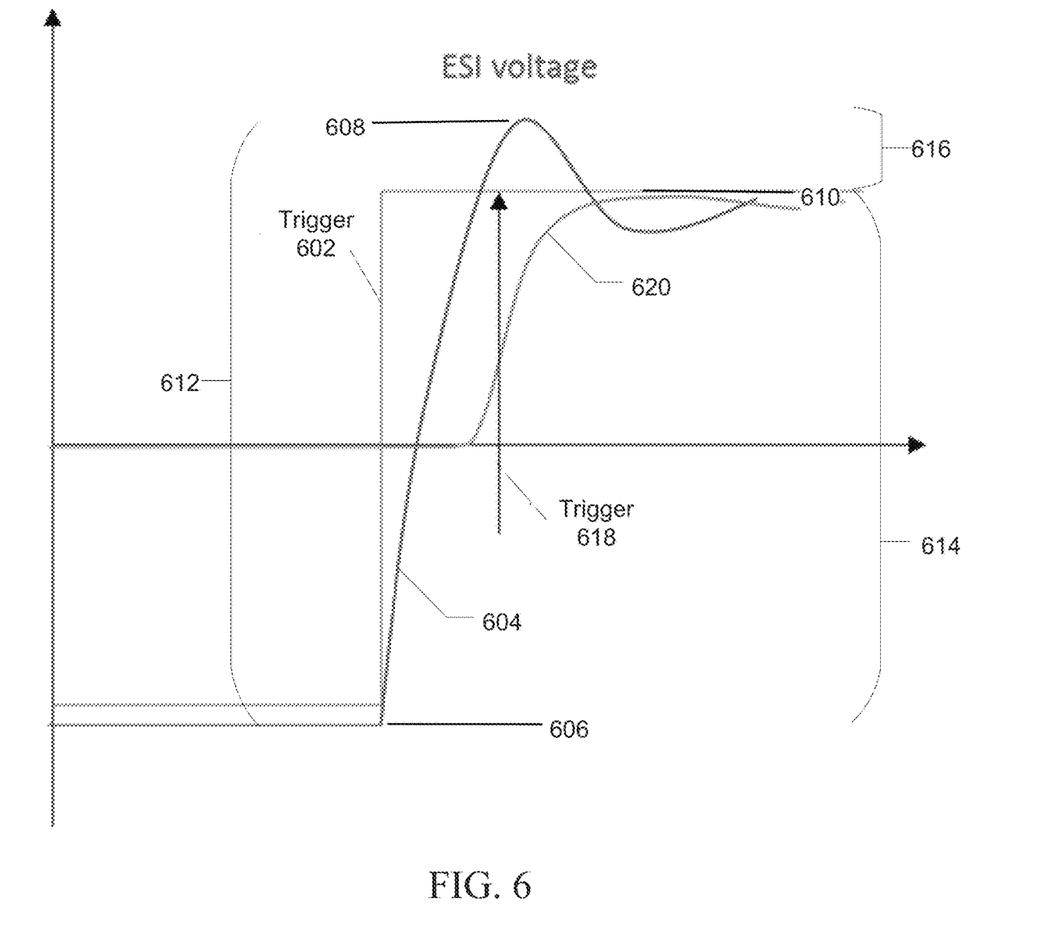
FIG. 6 is a diagram illustrating a switch in ion source polarity, in accordance with various embodiments.

FIGS. 5 and 6 illustrate a method of reducing the settling time of the ion source. This can be especially beneficial in cases where the establishment of ion signal after the source polarity switch is the dominating factor in overall settling time. It can often be the case that the rate of power supply voltage change is dependent on the switching range required. At 502, the source power supply can switch from the first polarity voltage to an overdrive voltage. Turning to FIG. 6, at trigger 602, the power supply output 604 can be switched from target voltage 606 to target voltage 608 which is a greater change than target voltage 610 required for the second polarity. The magnitude 612 between voltage 606 and voltage 608 can exceed the magnitude 614 by an amount 616. In various embodiments, amount 616 can be at least 10% of magnitude 614, even at least about 20% of magnitude 614.

Returning to FIG. 5, the power supply can be switched to the second polarity voltage at a second trigger, as shown in 504. In FIG. 6, this second trigger, trigger 618, can be initiated when the overdrive voltage or the second polarity voltage has been reached. At this point, as shown in 506 of FIG. 5, the power supply voltage can be controlled to maintain a stable beam of ion of the second polarity. As illustrated in FIG. 6, this may involve undershooting the voltage slightly as the voltage of the power supply is controlled by a feedback loop to achieve a desired output voltage. When using the overdrive method, the time for the output voltage of the power supply to reach the specified limit can be reduced by about 25% to about 50% or more.

In various embodiments, the overdrive method illustrated in FIGS. 5 and 6 can be applied to other components, such as ion guides, lenses, detectors, ion traps, mass filters, and the like. In general, the voltage or current supplied to the device can be switched to an overdrive voltage and then switched to the second polarity voltage once the overdrive voltage or second polarity voltage has been reached. In various embodiments, the rate of change can be a function of the magnitude of the difference between the starting and target voltages. Thus, the voltage or current can reach the second polarity voltage faster when first switching to the overdrive voltage. The magnitude of the difference between the second polarity voltage and the overdrive voltage can be a function of how precisely the voltage or current needs to be controlled.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

Results

Tests were conducting on a source power supply with a load of 98 μA and 111 pF. A comparison was made between setting the target voltage at the desired output voltage at the switch time (No Overdrive) and initially setting the target voltage beyond the desired output voltage (Overdrive). Without overdrive, the output voltage reached the specified limit within 4.06 ms. With overdrive, the output voltage reached the specified limit within 2.08 ms.

What is claimed is:

1. A mass spectrometer, comprising:
   an ion source configured to ionize a sample to produce ions;
   a mass analyzer configured to separate the ions based on their mass-to-charge ratio;
   a detector configured to detect ions;
   an ion optics component configured to direct ions along at least part of the path from the ion source to the mass analyzer to the detector; and
   a controller configured to
      switch the source at a first time from a first polarity source voltage to a second polarity source voltage; and
      switch the detector or the ion optics component at a second time from a first voltage to a second voltage, the second time being offset from the first time, the first voltage being a first polarity detector voltage or a first polarity ion optics voltage and the second voltage being a second polarity detector voltage or a second polarity ion optics voltage.

2. The mass spectrometer of claim 1, wherein the controller is further configured to switch the source or the ion optics voltage by changing from a first voltage to an overdrive voltage and changing to the second voltage when a voltage output reaches the second voltage, the first voltage being the first polarity source voltage or the first polarity ion optics voltage and the second voltage being the second polarity source voltage or the second polarity ion optics voltage, the magnitude of the difference between the first voltage and the overdrive voltage being greater than the magnitude of the difference between the first voltage and the second voltage.

3. The mass spectrometer of claim 2, wherein the magnitude of the difference between the first polarity source voltage and the overdrive voltage is at least 10% greater than the magnitude of the difference between the first polarity source voltage and the second polarity source voltage.

4. The mass spectrometer of claim 3, wherein the magnitude of the difference between the first polarity source voltage and the overdrive voltage is at least 20% greater than the magnitude of the difference between the first polarity source voltage and the second polarity source voltage.

5. The mass spectrometer of claim 1, wherein the second time is offset from the first time by at least an ion flight time from the source to the detector.

6. The mass spectrometer of claim 1, wherein the controller is further configured to switch at least one mass analyzer at a third time from a first polarity analyzer voltage to a second polarity analyzer voltage, the third time being offset from the first time by at least an ion flight time from the source to the mass analyzer.

7. The mass spectrometer of claim 6, wherein the third time is substantially the same as the second time.

8. The mass spectrometer of claim 1, wherein the ion optics component includes a lens or an ion guide.

9. The mass spectrometer of claim 1, wherein the mass analyzer includes an ion trap or a mass filter.

10. A method comprising:
    analyzing a first ion at a first polarity;
    switching an ion source at a first time from a first polarity source voltage to a second polarity source voltage;
    switching at least one ion optics component or mass analyzer at a second time from a first voltage to a second voltage, the second time being offset from the first time by at least an ion flight time from the source to the ion optics component or the mass analyzer, the first voltage being a first polarity ion optics voltage or a first polarity mass analyzer voltage and the second voltage being a second polarity ion optics voltage or a second polarity mass analyzer voltage; and analyzing a second ion at the second polarity.

11. The method of claim 10, wherein switching the source voltage, the ion optics voltage, or the mass analyzer voltage including changing from a first voltage to an overdrive voltage and changing to the second voltage when a voltage output reaches the second voltage, the first voltage being the first polarity source voltage, the first polarity ion optics voltage, or the first polarity mass analyzer voltage and the second voltage being the second polarity source voltage, the second polarity ion optics voltage, or the second polarity mass analyzer voltage, the magnitude of the difference between the first voltage and the overdrive voltage being greater than the magnitude of the difference between the first voltage and the second voltage.

12. The method of claim 11, wherein the magnitude of the difference between the first polarity source voltage and the overdrive voltage is at least 10% greater than the magnitude of the difference between the first polarity source voltage and the second polarity source voltage.

13. The method of claim 10, wherein the second time is offset from the first time by at least an ion flight time from the source to the ion optics component or the mass analyzer.

14. A method comprising:

analyzing a first ion at a first polarity;

switching an ion source at a first time from a first polarity source voltage to a second polarity source voltage;

switching a detector at a second time from a first polarity detector voltage to a second polarity detector voltage, the second time being offset from the first time;

analyzing a second ion at the second polarity.

15. The method of claim 14, wherein switching the source voltage or an ion optics voltage including changing from a first voltage to an overdrive voltage and changing to a second voltage when a voltage output reaches the second voltage, the first voltage being the first polarity source voltage or a first polarity detector voltage and the second voltage being the second polarity source voltage or the second polarity ion optics voltage, the magnitude of the difference between the first voltage and the overdrive voltage being greater than the magnitude of the difference between the first voltage and the second voltage.

16. The method of claim 15, wherein the magnitude of the difference between the first voltage and the overdrive voltage is at least 10% greater than the magnitude of the difference between the first voltage and the second voltage.

17. The method of claim 14, wherein the second time is offset from the first time by at least an ion flight time from the source to the detector.

18. The method of claim 14, further comprising switching at least one ion optics component at a third time from a first polarity ion optics voltage to a second polarity ion optics voltage, the third time being offset from the first time by at least an ion flight time from the source to the ion optics component.

19. The method of claim 14, further comprising switching at least one mass analyzer at a fourth time from a first polarity analyzer voltage to a second polarity analyzer voltage, the fourth time being offset from the first time by at least an ion flight time from the source to the mass analyzer.

20. The method of claim 19, wherein the mass analyzer includes an ion trap or a mass filter.

* * * * *